Patented Nov. 8, 1932

1,886,797

UNITED STATES PATENT OFFICE

WILHELM ECKERT, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

NAPHTHALIMIDE DYESTUFFS AND PROCESS OF PREPARING THEM

No Drawing. Application filed May 7, 1929, Serial No. 361,255, and in Germany May 18, 1928.

My present invention relates to naphthalimide dyestuffs and to a process of preparing them.

I have found that water-soluble acid wool dyestuffs are obtainable by causing a halogen sulfo-naphthalic anhydride or a derivative thereof of the general type:

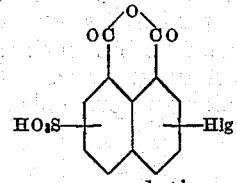

to react in an aqueous solution with ammonia or a primary aliphatic or aromatic amine. If desired, the reaction can be carried out in an autoclave. By my new process acid wool dyestuffs of good levelling power are obtainable which yield very clear greenish-yellow to reddish-orange tints. They have been described and claimed partly in my U. S. Patent No. 1,796,011 (application Serial No. 313,954, filed October 20, 1928). In the present application I wish to claim as new products the compounds of the following probable formula:

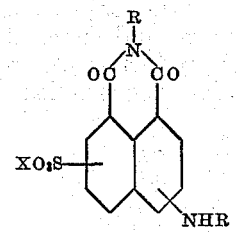

wherein R stands for alkyl, aryl or aralkyl and X stands for hydrogen or an alkali metal.

The following examples serve to illustrate my invention; the parts being by weight unless otherwise stated:

(1) 40 parts of sulfo-4-bromo-naphthalic-anhydride (obtainable by sulfonating 4-bromo-naphthalic anhydride) are heated to 110° C. to 120° C. with 200 parts by volume of ammonia in an autoclave. When the reaction is finished, the hot solution is filtered with suction, the excess of ammonia is expelled and the dyestuff thus obtained which has the following formula:

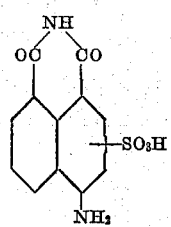

is salted out in the usual manner, filtered with suction and dried. It dyes the animal fiber from an acid bath clear yellow tints.

(2) 20 parts of sulfo-4-bromo-naphthalic-anhydride are heated to boiling with 200 parts by volume of water and 20 parts of para-toluidine for some hours. The excess of para-toluidine is then expelled by steam. When the filtrate cools down, the new dyestuff which probably has the following formula:

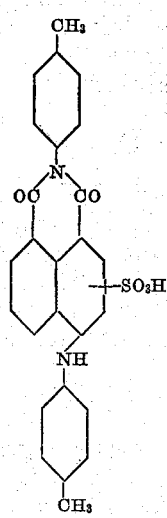

is precipitated in reddish crystals filtered with suction and dried. It dyes wool from an acid bath clear reddish-orange tints.

When using instead of para-toluidine for instance aniline and proceeding in the manner indicated in Example 2, there is obtained a dyestuff of similar properties but of a little less reddish tint.

When using instead of sulfo-4-bromo-naphthalic-anhydride, as this is done in Examples 1 and 2, the sulfo-4-chloro-naphthalic-anhydride (obtainable by sulfonating 4-chloro-naphthalic-anhydride) and condensing with ammonia, aniline, toluidine or the like, the same dyestuffs are obtained.

(3) 25 parts of sulfo-4-chloro-naphthalic acid and anhydride respectively are heated, while stirring, to 60° C. to 70° C. for some hours with 120 parts by volume of an aqueous methyl-amine solution of about 30% strength and are then heated to 90° C. to 100° C. after addition of further 50 parts by volume of the said methylamine solution.

After cooling the dyestuff thus obtained is completely precipitated by addition of, for instance, common salt, filtered by suction, washed with a solution of common salt and finally dried.

The dyestuff is a deep yellow powder of the following probable constitution:

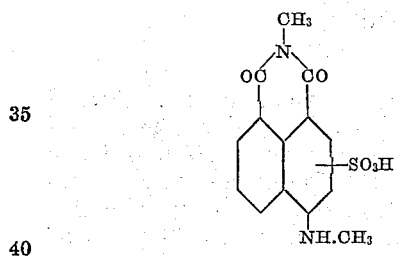

It is soluble in water and dyes the animal fiber from an acid bath yellow tints.

I claim:

1. The process which comprises causing a halogen-sulfo-naphthalic acid anyhdride compound to react with a compound of the following general formula:

R—NH$_2$ wherein R stands for hydrogen, aryl or alkyl.

2. The process which comprises heating to boiling temperature an aqueous solution of a halogen-sulfo-naphthalic acid anhydride compound in the presence of a compound of the following general formula:

R—NH$_2$ wherein R stands for hydrogen, aryl or alkyl.

3. The process which comprises heating to boiling temperature an aqueous solution of 4-halogen-sulfo-naphthalic acid anhydride in the presence of a compound of the following general formula:

R—NH$_2$ wherein R stands for hydrogen, aryl or alkyl.

4. The process which comprises heating to about 110° to 120° C. an aqueous solution of 4-bromo-sulfo-naphthalic acid anhydride with ammonia under super-atmospheric pressure.

5. As new products, the water-soluble dyestuffs of the following probable formula:

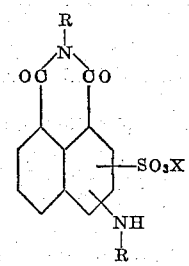

wherein X represents hydrogen or an alkali-metal and R stands for alkyl or aryl, the said dyestuffs dyeing the animal fiber from an acid bath very even and extremely clear tints.

6. As new products, the water-soluble dyestuffs of the following probable formula:

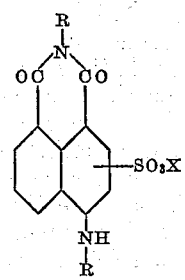

wherein X represents hydrogen or an alkali metal and R stands for alkyl or aryl, the said dyestuffs dyeing the animal fiber from an acid bath very even and extremely clear tints.

7. As a new product, a water-soluble dyestuff of the following formula:

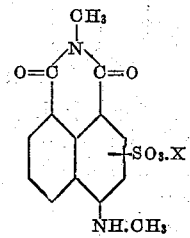

wherein X represents hydrogen or an alkali metal, which dyestuff dyes the animal fiber from an acid bath yellow tints.

8. As a new product, the water-soluble dyestuff of the following formula:
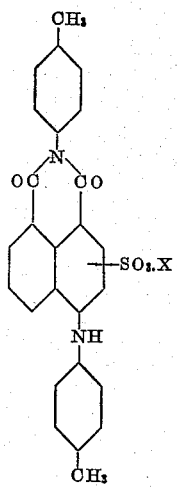
wherein X represents hydrogen or an alkali metal, which dyestuff dyes the animal fiber from an acid bath clear reddish-orange tints.
In testimony whereof, I affix my signature.
WILHELM ECKERT.